United States Patent
Laghate et al.

(10) Patent No.: US 11,917,601 B2
(45) Date of Patent: Feb. 27, 2024

(54) RECEIVER FOR PROCESSING MULTIPLE BEAMS AT A USER EQUIPMENT (UE) DEVICE

(71) Applicant: QUALCOMM Incorporated, San Diego, CA (US)

(72) Inventors: Mihir Vijay Laghate, San Diego, CA (US); Revathi Sundara Raghavan, San Diego, CA (US); Bhushan Shanti Asuri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 17/450,420

(22) Filed: Oct. 8, 2021

(65) Prior Publication Data
US 2023/0111312 A1    Apr. 13, 2023

(51) Int. Cl.
*H04W 72/044* (2023.01)
*H04W 24/10* (2009.01)
*H04B 7/08* (2006.01)

(52) U.S. Cl.
CPC ............ *H04W 72/046* (2013.01); *H04B 7/08* (2013.01); *H04W 24/10* (2013.01)

(58) Field of Classification Search
CPC ....... H04W 72/046; H04W 24/10; H04B 7/08
See application file for complete search history.

(56) References Cited

U.S. PATENT DOCUMENTS

| | | | | |
|---|---|---|---|---|
| 10,291,300 | B2* | 5/2019 | Willner | H04L 25/03891 |
| 10,564,291 | B1* | 2/2020 | McGregor | G01S 19/36 |
| 2009/0296666 | A1* | 12/2009 | Rimini | H04J 13/0048 375/267 |
| 2014/0269865 | A1* | 9/2014 | Aparin | H04L 27/0002 375/222 |
| 2016/0142125 | A1* | 5/2016 | Elmakias | H04B 7/0837 375/340 |
| 2022/0149877 | A1* | 5/2022 | Wu | H04B 1/16 |
| 2022/0304038 | A1* | 9/2022 | Zhang | H04L 5/0057 |

FOREIGN PATENT DOCUMENTS

WO    WO-2020250301 A1 * 12/2020

* cited by examiner

*Primary Examiner* — Deepa Belur
(74) *Attorney, Agent, or Firm* — Norton Rose Fulbright US LLP

(57) ABSTRACT

A method of wireless communication includes receiving a first beam using a first antenna device during an occasion of a reference signal. The method further includes receiving a second beam using a second antenna device that is distinct from the first antenna device during the occasion of the reference signal. Receiving the first beam and the second beam includes inputting, to a modem, a representation of a combination of the first beam and the second beam. Receiving the first beam and the second beam further includes generating, by the modem based on the representation, a first signal associated with the first beam using a first parameter associated with the first antenna device and a second signal associated with the second beam using a second parameter associated with the second antenna device.

30 Claims, 10 Drawing Sheets

RECEIVER FOR PROCESSING MULTIPLE BEAMS AT A USER EQUIPMENT (UE) DEVICE

TECHNICAL FIELD

Aspects of the present disclosure relate generally to wireless communication systems, and more particularly, to receivers that process beams in wireless communication systems.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, a method of wireless communication includes receiving a first beam using a first antenna device during an occasion of a reference signal. The method further includes receiving a second beam using a second antenna device that is distinct from the first antenna device during the occasion of the reference signal. Receiving the first beam and the second beam includes inputting, to a modem, a representation of a combination of the first beam and the second beam. Receiving the first beam and the second beam further includes generating, by the modem based on the representation, a first signal associated with the first beam using a first parameter associated with the first antenna device and a second signal associated with the second beam using a second parameter associated with the second antenna device.

In some other aspects, an apparatus for wireless communication includes a transmitter and a receiver configured to receive a first beam using a first antenna device during an occasion of a reference signal. The receiver is further configured to receive a second beam using a second antenna device that is distinct from the first antenna device during the occasion of the reference signal and to generate a representation of a combination of the first beam and the second beam. The receiver is further configured to generate, based on the representation, a first signal associated with the first beam using a first parameter associated with the first antenna device and a second signal associated with the second beam using a second parameter associated with the second antenna device.

In some other aspects, a non-transitory computer-readable medium storing instructions executable by a processor of a UE to initiate, perform, or control operations. The operations include receiving a first beam using a first antenna device during an occasion of a reference signal. The operations further include receiving a second beam using a second antenna device that is distinct from the first antenna device during the occasion of the reference signal. Receiving the first beam and the second beam includes inputting, to a modem, a representation of a combination of the first beam and the second beam and further includes generating, by the modem based on the representation, a first signal associated with the first beam using a first parameter associated with the first antenna device and a second signal associated with the second beam using a second parameter associated with the second antenna device.

In some other aspects, an apparatus for wireless communication includes means for transmitting signals. The apparatus further includes means for receiving a first beam using a first antenna device during an occasion of a reference signal, for receiving a second beam using a second antenna device that is distinct from the first antenna device during the occasion of the reference signal, for generating a representation of a combination of the first beam and the second beam, and for generating, based on the representation, a first signal associated with the first beam using a first parameter associated with the first antenna device and a second signal associated with the second beam using a second parameter associated with the second antenna device.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
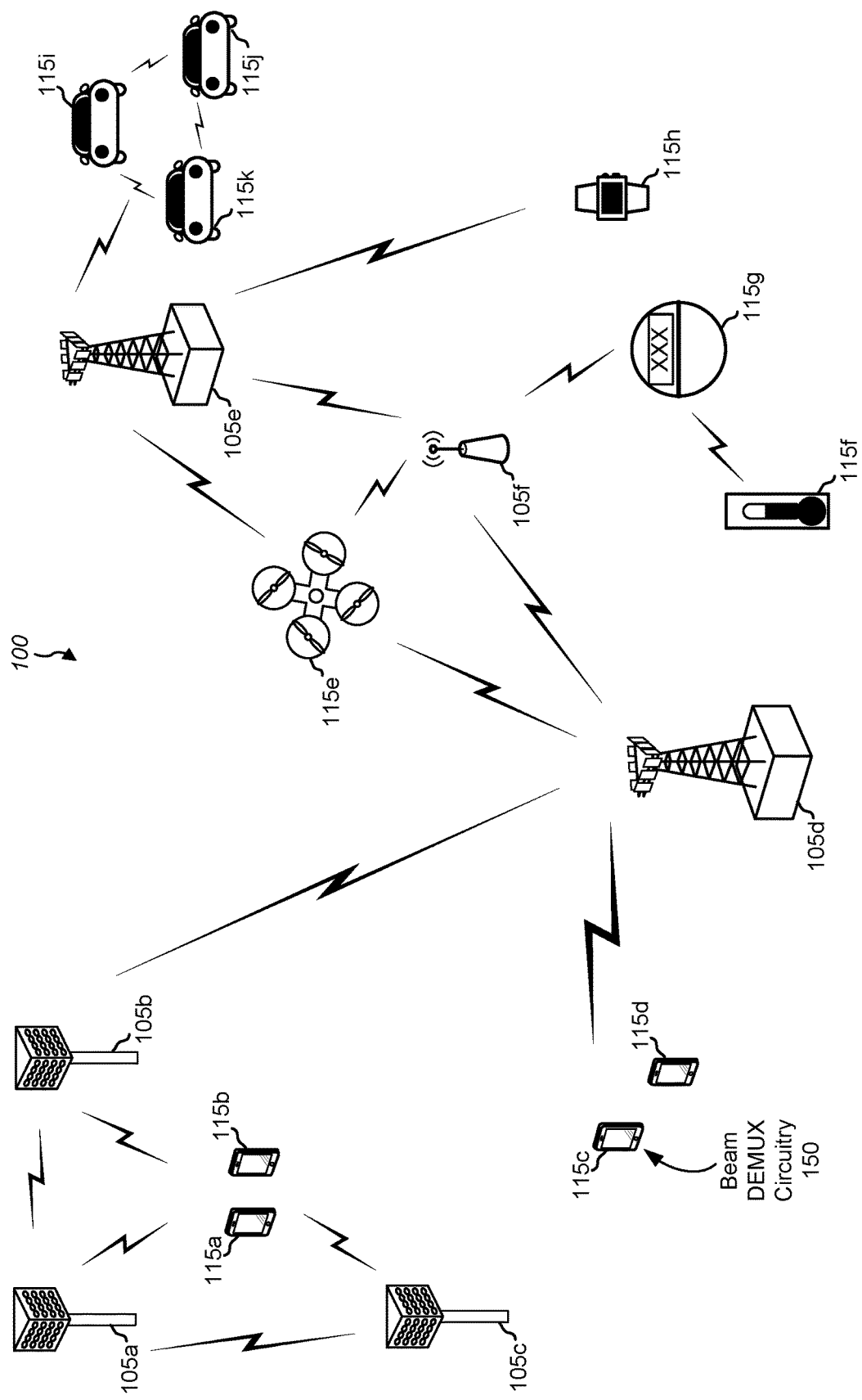
FIG. 1 is a block diagram illustrating an example of a wireless communication system that supports measuring multiple beams in parallel according to some aspects of the disclosure.

Wireless communication systems use beams to focus signal energy in particular directions, which may improve signal quality and communication reliability in some cases compared to some other techniques that isotopically transmit signals. To select beams for communication, a base station may transmit a reference signal, such as a synchronization signal block (SSB), a channel state information reference signal (CSI-RS), or a demodulation reference signal (DMRS), and a user equipment (UE) may perform a beam sweep of the reference signal. Performing the beam sweep may include measuring multiple receive beams using the reference signal and selecting a particular receive beam that increases a received signal strength or other parameter associated with the reference signal. In some examples, the UE may transmit a measurement report to base station indicating results of the beam sweep.

Performing a beam sweep may use resources of a UE and may reduce performance in some circumstances, particularly for a large number of beams. To illustrate, in some implementations, a UE may be capable of simultaneously receiving one beam for each receive chain of the UE. If a base station transmits an SSB every 20 milliseconds (ms), and if the UE includes two receive chains, then a beam sweep of 20 beams may take the UE approximately 200 ms to complete, which may be relatively long in some applications.

In addition, a beam sweep may increase power consumption of a UE, such as by decreasing an amount of time the UE operates according to a sleep mode. For example, by waking up relatively often (such as every 20 ms) to measure beams, the UE may be unable to enter a "deep sleep" mode and may instead operate based on a "light sleep" mode that is associated with a greater power consumption than the deep sleep mode.

Further, in some circumstances that involve a rapidly changing channel conditions between a UE and a base station, the "best" beam measured by the UE may change rapidly. For example, the UE may be located in a vehicle with a relatively high velocity (or the vehicle may correspond to the UE, such as in connection with a vehicle-to-everything (V2E) implementation). In such examples, reliability or quality of wireless communication may be reduced due to the length of time needed by the UE to complete a beam seep.

Some UE designs may use multiple receive chains to increase a number of beams processed simultaneously (and thus reduce the length of time needed to complete a beam sweep). Increasing the number of receive chains may be relatively expensive and may reduce area of the UE available to other device components. As a result, increasing the number of receive chains may be infeasible in some applications, such as for some low cost and small form factor devices.

In some aspects of the disclosure, a UE may include a receiver that generates orthogonal representations of multiple beams (also referred to herein as multiplexed representations of multiple beams). The receiver may combine (e.g., sum or multiplex) the orthogonal representations to generate a signal that is input to one or more components of the receiver, such as a downconverter circuit and an analog-to-digital converter (ADC) converter circuit. The receiver may include a modem that separates the orthogonal representations of multiple beams to enable the modem to perform measurements of the beams.

To illustrate, the receiver may be configured to receive a first beam and a second beam. The receiver may generate an first representation of the first beam and a second representation of the second beam, where the second representation is orthogonal to the first representation. For example, the receiver may apply a first code (e.g., a first scrambling code) to the first beam (such as by multiplying the first beam with the first code) and may apply a second code (e.g., a second scrambling code) the second beam (such as by multiplying the second beam with the second code), where the second code is orthogonal to the first code. Alternatively or in addition, the receiver may downconvert the first beam to a first frequency range and may downconvert the second beam to a second frequency range that is distinct from the first frequency range.

After generating the orthogonalized beams, the receiver may combine the orthogonalized beams (e.g., using a summation circuit) to generate a representation of a combination of the beams. The receiver may input the representation into one or more components of the receiver to perform certain processing operations, such as by inputting the representation to a downconverter circuit to downconvert the representation to a baseband frequency range and by inputting the baseband representation of the orthogonalized beams to an ADC circuit to digitize the baseband representation of the orthogonalized beams.

The modem may separate (or isolate) the beams from the digitized baseband representation to enable measurement of the beams (e.g., for a beam sweep). For example, the modem may use correlator circuits to separate the first beam from the second beam within the digitized baseband representation. Alternatively or in addition, the modem may use frequency selector circuits to separate the first beam from the second beam within the digitized baseband representation.

By selectively combining and separating orthogonalized representations of the beams, the UE may simultaneously measure a number of beams that is greater than a number of receive chains or receive chain components of the UE. For example, the UE may include a first number of receive chains or receive chain components, and the receiver may be configured to simultaneously measure a second number of beams, where the second number is greater than the first number. As a result, an amount of time used to measure the beams may be reduced (which may increase an amount of time the UE spends in a "deep sleep" mode, decreasing power consumption, and which may improve tracking of channel conditions in some high mobility applications, improving communication reliability) while also decreasing a number of receive chains or receive chain components of the UE (which may reduce device cost, size, and complexity). Further, in some other examples, measuring multiple beams per occasion of a reference signal may enable the UE to "sleep through" one or more occasions of the reference signal, reducing power consumption of the UE.

Some aspects of the disclosure may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system that supports measuring multiple beams in parallel according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115e, which is a drone. Redundant communication links with UE 115e include from macro base stations 105d and 105e, as well as small cell base station 105f Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

In some implementations, one or more UEs 115 depicted in FIG. 1 may include beam demultiplexing (DEMUX) circuitry 150 to enable measuring multiple beams in parallel. For example, in FIG. 1, the UE 115c may include the beam demultiplexing circuitry 150.

Figure 2:
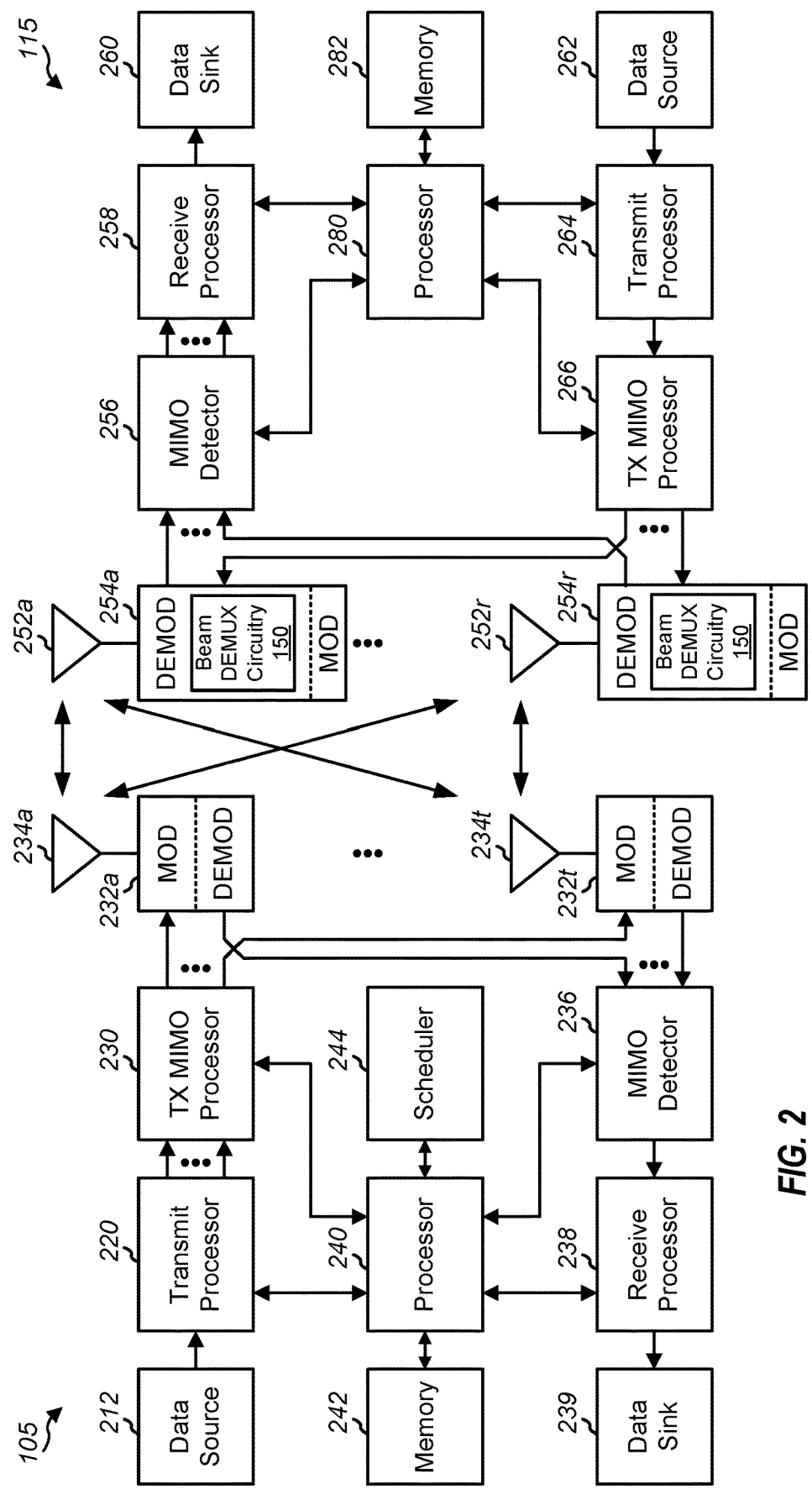
FIG. 2 is a block diagram illustrating an example of a base station and a user equipment (UE) that supports measuring multiple beams in parallel according to some aspects of the disclosure.

FIG. 2 is a block diagram illustrating examples of a base station 105 and a UE 115 that supports measuring multiple beams in parallel according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from processor 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280, such as a processor.

The UE 115 may further include the beam demultiplexing circuitry 150. For example, each demodulator 254 may include circuitry corresponding to the beam demultiplexing circuitry 150. As illustrative examples, FIG. 2 illustrates that the demodulator 254*a* may include circuitry corresponding to the beam demultiplexing circuitry 150 and that the demodulator 254*r* may include circuitry corresponding to the beam demultiplexing circuitry 150.

On the uplink, at UE 115, transmit processor 264 may receive and process data (e.g., for a physical uplink shared channel (PUSCH)) from data source 262 and control information (e.g., for a physical uplink control channel (PUCCH)) from processor 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to processor 240.

Processors 240 and 280 may direct the operation at base station 105 and UE 115, respectively. Processor 240 or other processors and modules at base station 105 or processor 280 or other processors and modules at UE 115 may perform or direct the execution of various processes for the techniques described herein, such as to perform or direct one or more operations illustrated in FIG. 8, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
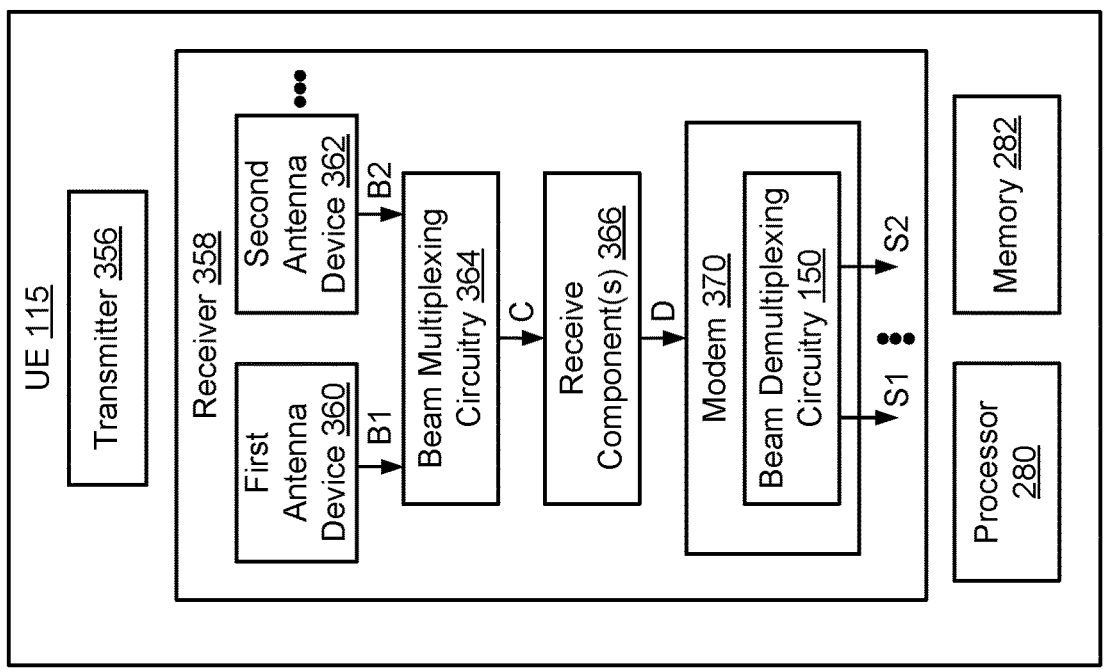
FIG. 3 is a block diagram illustrating an example of a wireless communication system that supports measuring multiple beams in parallel according to some aspects of the disclosure.
Figure 3:
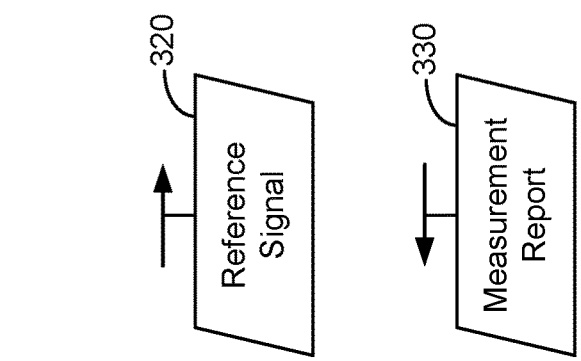
Figure 3:
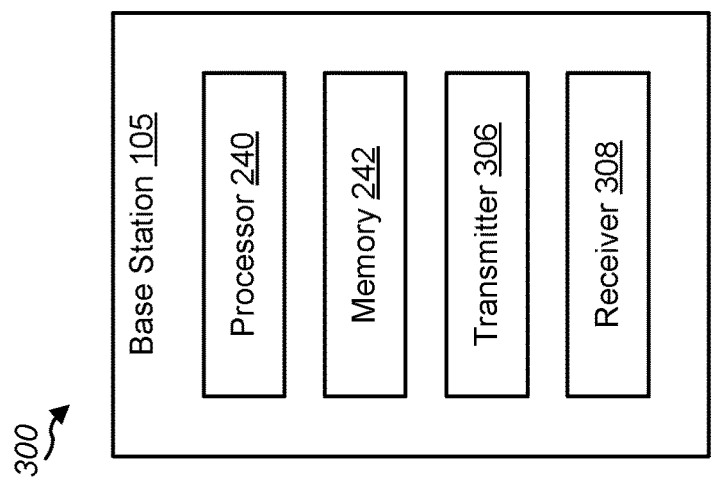

FIG. 3 is a block diagram illustrating an example of a wireless communication system 300 that supports measuring multiple beams in parallel according to some aspects of the disclosure. The wireless communication system 300 may include one or more base stations, such as the base station 105. The wireless communication system 300 may further include one or more UEs, such as the UE 115.

The example of FIG. 3 illustrates that the base station 105 may include one or more processors (such as the processor 240) and may include the memory 242. The base station 105 may further include a transmitter 306 and a receiver 308. The processor 240 may be coupled to the memory 242, to the transmitter 306, and to the receiver 308. In some examples, the transmitter 306 and the receiver 308 include one or more components described with reference to FIG. 2, such as one or more of the modulator/demodulators 232a-t, the MIMO detector 236, the receive processor 238, the transmit processor 220, or the TX MIMO processor 230. In some implementations, the transmitter 306 and the receiver 308 may be integrated in one or more transceivers of the base station 105.

The transmitter 306 may be configured to transmit reference signals, synchronization signals, control information, and data to one or more other devices, and the receiver 308 may be configured to receive reference signals, control information, and data from one or more other devices. For example, the transmitter 306 may be configured to transmit signaling, control information, and data to the UE 115, and the receiver 308 may be configured to receive signaling, control information, and data from the UE 115.

FIG. 3 also illustrates that the UE 115 may include one or more processors (such as the processor 280), a memory (such as the memory 282), a transmitter 356, and a receiver 358. The processor 280 may be coupled to the memory 282, to the transmitter 356, and to the receiver 358. In some examples, the transmitter 356 and the receiver 358 may include one or more components described with reference to FIG. 2, such as one or more of the modulator/demodulators 254a-r, the MIMO detector 256, the receive processor 258, the transmit processor 264, or the TX MIMO processor 266. In some implementations, the transmitter 356 and the receiver 358 may be integrated in one or more transceivers of the UE 115.

The transmitter 356 may be configured to transmit reference signals, synchronization signals, control information, and data to one or more other devices, and the receiver 358 may be configured to receive reference signals, control information, and data from one or more other devices. For example, in some implementations, the transmitter 356 may be configured to transmit signaling, control information, and data to the base station 105, and the receiver 358 may be configured to receive signaling, control information, and data from the base station 105.

In some implementations, one or more of the transmitter 306, the receiver 308, the transmitter 356, or the receiver 358 may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

To further illustrate, in some examples, the receiver 358 includes or is coupled to a first antenna device 360 and a second antenna device 362. In some examples, the first antenna device 360 may include a first antenna panel or antenna array, and the second antenna device 362 may include a second antenna panel or antenna array. The first antenna device 360 and the second antenna device 362 may include any of the antennas 252a-r of FIG. 2. The receiver 358 may further include beam multiplexing circuitry 364, one or more receive components 366, and a modem 370. In some examples, the modem 370 includes or corresponds to any of the modulators/demodulators 254 of FIG. 2. The beam multiplexing circuitry 364 may be coupled to the first antenna device 360, to the second antenna device 362, and to the one or more receive components 366. The modem 370 may include the beam demultiplexing circuitry 150. The beam demultiplexing circuitry 150 may be coupled to the one or more receive components 366.

During operation, the base station 105 transmit one or more signals received by the UE 115. For example, the base station 105 may transmit a reference signal 320, such as one or more synchronization signal blocks (SSBs), a channel state information reference signal (CSI-RS), or a demodulation reference signal (DMRS), as illustrative examples. In some wireless communication protocols, the base station 105 may transmit the reference signal 320 for 5 milliseconds (ms) every 20 ms. In such examples, an occasion of the reference signal 320 may have a duration of 5 ms and a periodicity of 20 ms. In some circumstances, the UE 115 may operate according to an inactive or sleep mode in between at least some occasions of the reference signal 320, such as by operating according to a connected discontinuous reception (CDRX) mode of operation in between the occasions of the reference signal 320.

During an occasion of the reference signal 320, the UE 115 may receive the reference signal 320 using the receiver 358. In some examples, the UE 115 receives the reference signal 320 by generating multiple beams associated with the reference signal 320. For example, during an occasion of the reference signal 320, the receiver 358 may receive a first beam B1 associated with the reference signal 320 using the first antenna device 360 and may receive a second beam B2 associated with the reference signal 320 using the second antenna device 362.

In some aspects of the disclosure, the receiver 358 may use the beam multiplexing circuitry 364 to generate a representation C of a combination of the first beam B1 and the second beam B2. For example, the beam multiplexing circuitry 364 may perform operations to orthogonalize the first beam B1 and the second beam B2 and to combine (e.g., sum or multiplex) the orthogonalized beams to generate the representation C of the combination of the first beam B1 and the second beam B2.

The receiver 358 may input the representation C to the one or more receive components 366 to perform one or more operations to generate a representation D of the combination of the first beam B1 and the second beam B2. To illustrate, in some examples, the one or more receive components 366 include an analog-to-digital (ADC) converter circuit that digitizes the representation C to generate the representation D.

The receiver 358 may input the representation D to the modem 370 (e.g., to the beam demultiplexing circuitry 150). The modem 370 may generate, based on the representation D, a first signal S1 associated with the first beam B1 using a first parameter associated with the first antenna device 360 and a second signal S2 associated with the second beam B2 using a second parameter associated with the second antenna device 362. For example, the first parameter may correspond to a first code associated with the first antenna device 360, and the second parameter may correspond to a second code associated with the second antenna device 362. The second code may be orthogonal to the first code. In some other examples, the first parameter may correspond to a first frequency (or frequency range) associated with the first antenna device 360, and the second parameter may correspond to a second frequency (or frequency range) associated with the second antenna device 362. The second frequency (or frequency range) may be distinct form (or orthogonal to) the first frequency (or frequency range). For example, the second frequency range may exclude frequencies that are included in the first frequency range (and vice versa).

In some implementations, use of the parameters may enable the receiver 358 to combine (or multiplex) and separate (or demultiplex) the beams B1, B2, which may simplify certain operations, reduce power consumption, reduce device complexity, or a combination thereof. For example, in some implementations, the one or more receive components 366 may include a single ADC circuit that generates a single representation D of the sum of the beams B1, B2, which may reduce power consumption and device complexity associated with the UE 115.

The UE 115 may use the signals S1, S2 in connection with one or more operations. In some examples, the UE 115 may transmit a measurement report 330 based on the signals S1, S2. For example, the UE 115 may compare the signals S1, S2 to select the first beam B1 or the second beam B2, such as by selecting the beam having the greater signal strength or signal-to-noise ratio (SNR) value. The measurement report 330 may indicate the selected beam. Alternatively or in addition, the UE 115 may use the signals S1, S2 to receive one or more signals from the base station 105. For example, the UE 115 may use the signals S1, S2 as feedback to the antenna devices 360, 362 to enable the antenna devices 360, 362 to perform phase steering based on the signals S1, S2.

Figure 4:
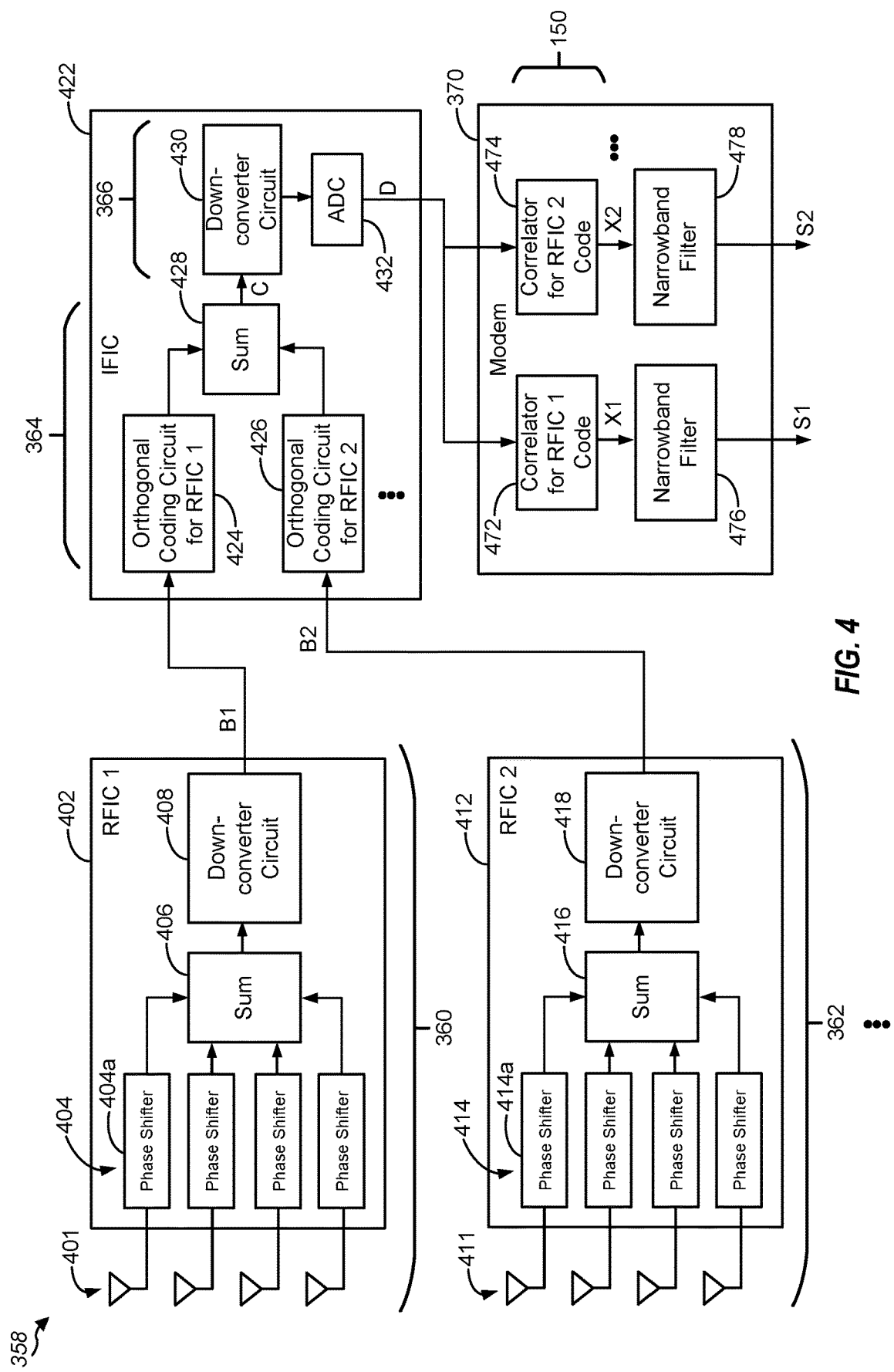
FIG. 4 is a block diagram illustrating an example of a receiver that supports measuring multiple beams in parallel according to some aspects of the disclosure.

FIG. 4 is a block diagram illustrative an example of a receiver 358 that supports measuring multiple beams in parallel according to some aspects of the disclosure. The receiver 358 may include multiple radio frequency integrated circuits (RFICs), such as a first RFIC 402 and a second RFIC 412. The first RFIC 402 may be coupled to a first set of antennas 401, and the second RFIC 412 may be coupled to a second set of antennas 411. Each set of antennas 401, 411 may include a particular number of antennas, such as four antennas or another number of antennas. The first RFIC 402 may include first phase shifter circuits 404 (such as a representative phase shifter circuit 404a), and the second RFIC 412 may include second phase shifter circuits 414 (such as a representative phase shifter circuit 414a). The first RFIC 402 may further include a summation circuit 406 coupled to the first phase shifter circuits 404 may further include a downconverter circuit 408 coupled to the summation circuit 406. The second RFIC 412 may further include a summation circuit 416 coupled to the second phase shifter circuits 414 may further include a downconverter circuit 418 coupled to the summation circuit 406.

The receiver 358 may further include an intermediate frequency integrated circuit (IFIC) 422 coupled to the first RFIC 402 and to the second RFIC 412. The IFIC 422 may include a first orthogonal coding circuit 424 associated with the first RFIC 402 and a second orthogonal coding circuit 426 associated with the second RFIC 412. The IFIC 422 may further include a summation circuit 428, a downconverter circuit 430, and an ADC circuit 432. The summation circuit 428 may be coupled to the first orthogonal coding circuit 424 and to the second orthogonal coding circuit 426. The downconverter circuit 430 may be coupled to the summation circuit 428 and to the ADC circuit 432.

The receiver 358 may further include the modem 370. In the example of FIG. 4, the modem 370 may include a first correlator 472 associated with the first RFIC 402 and may further include a second correlator 474 associated with the second RFIC 412. The modem 370 may further include a first narrowband filter 476 associated with the first RFIC 402 and may also include a second narrowband filter 478 associated with the second RFIC 412. The first narrowband filter 476 may be coupled to an output of the first correlator 472, and the second narrowband filter 478 may be coupled to an output of the second correlator 474.

In some examples, the first antenna device 360 may include the first set of antennas 401 and the first RFIC 402, and the second antenna device 362 may include the second set of antennas 411 and the second RFIC 412. The beam multiplexing circuitry 364 may include the first orthogonal coding circuit 424, the second orthogonal coding circuit 426, and the summation circuit 428. The one or more receive components 366 may include the downconverter circuit 430 and the ADC circuit 432.

During operation, the first RFIC 402 may use the first set of antennas 401 and the first phase shifter circuits 404 to selectively receive the first beam B1, such as by receiving signal energy in a first direction. The second RFIC 412 may use the second set of antennas 411 and the second phase shifter circuits 414 to selectively receive the second beam B2, such as by receiving signal energy in a second direction different than the first direction. The first phase shifter circuits 404 may perform one or more of phase shifting or amplitude shifting. For example, each of the first phase shifter circuits 404 may receive a respective signal and may multiple the signal by a respective value (e.g., a complex value) to perform one or more of phase shifting or amplitude shifting of the signal.

The first RFIC 402 may sum signals generated by the first set of antennas 401 and the first phase shifter circuits 404 to generate a combined signal, and the downconverter circuit 408 may downconvert the combined signal to an intermediate frequency (IF) range to generate the first beam B1. The second RFIC 412 may sum signals generated by the second set of antennas 411 and the second phase shifter circuits 414 to generate a combined signal, and the downconverter circuit 418 may downconvert the combined signal to an IF range to generate the second beam B2.

The first orthogonal coding circuit 424 may apply a first code to the first beam B1, and the second orthogonal coding circuit 426 may apply a second code to the second beam B2, where the second code is orthogonal to the first code. For example, the first orthogonal coding circuit 424 may multiply the first beam B1 with the first code to generate a first orthogonalized signal, and the second orthogonal coding circuit 426 may multiply the second beam B2 with the second code to generate a second orthogonalized signal that is orthogonal to the first orthogonalized signal. The summation circuit 428 may combine (e.g., sum) the first orthogonalized signal and the second orthogonalized signal to generate the representation C of the combination of the beams B1, B2. The downconverter circuit 430 may downconvert the representation C to a signal having a baseband frequency range, and the ADC circuit 432 may digitize the signal to generate the representation D of the combination of the beams B1, B2.

The modem 370 may receive the representation D and may correlate (e.g., using the first correlator 472) the representation D to the first code associated with the first RFIC 402 to generate a first output signal X1. The modem 370 may also correlate (e.g., using the second correlator 474) the representation D to the second code associated with the second RFIC 412 to generate a second output signal X2. The modem 370 may perform narrowband filtering of the first output signal X1 (e.g., using the first narrowband filter 476) to generate the first signal S1 and may perform narrowband filtering of the second output signal X2 to generate the second signal S2.

In some examples, the modem 370 may provide the signals S1, S2 to a higher-level application. For example, the signals S1, S2 may be associated with a first layer (L1) of a wireless communication protocol stack, such as a physical (PHY) layer, and the modem 370 may provide the signals S1, S2, to a layer two (L2) application, such as a medium access control (MAC) layer application, or to a layer three (L3) application, such as a radio resource control (RRC) application or an Internet Protocol (IP) application. In some examples, the UE 115 may transmit the measurement report 330 of FIG. 3 based on the signals S1, S2.

Figure 5:
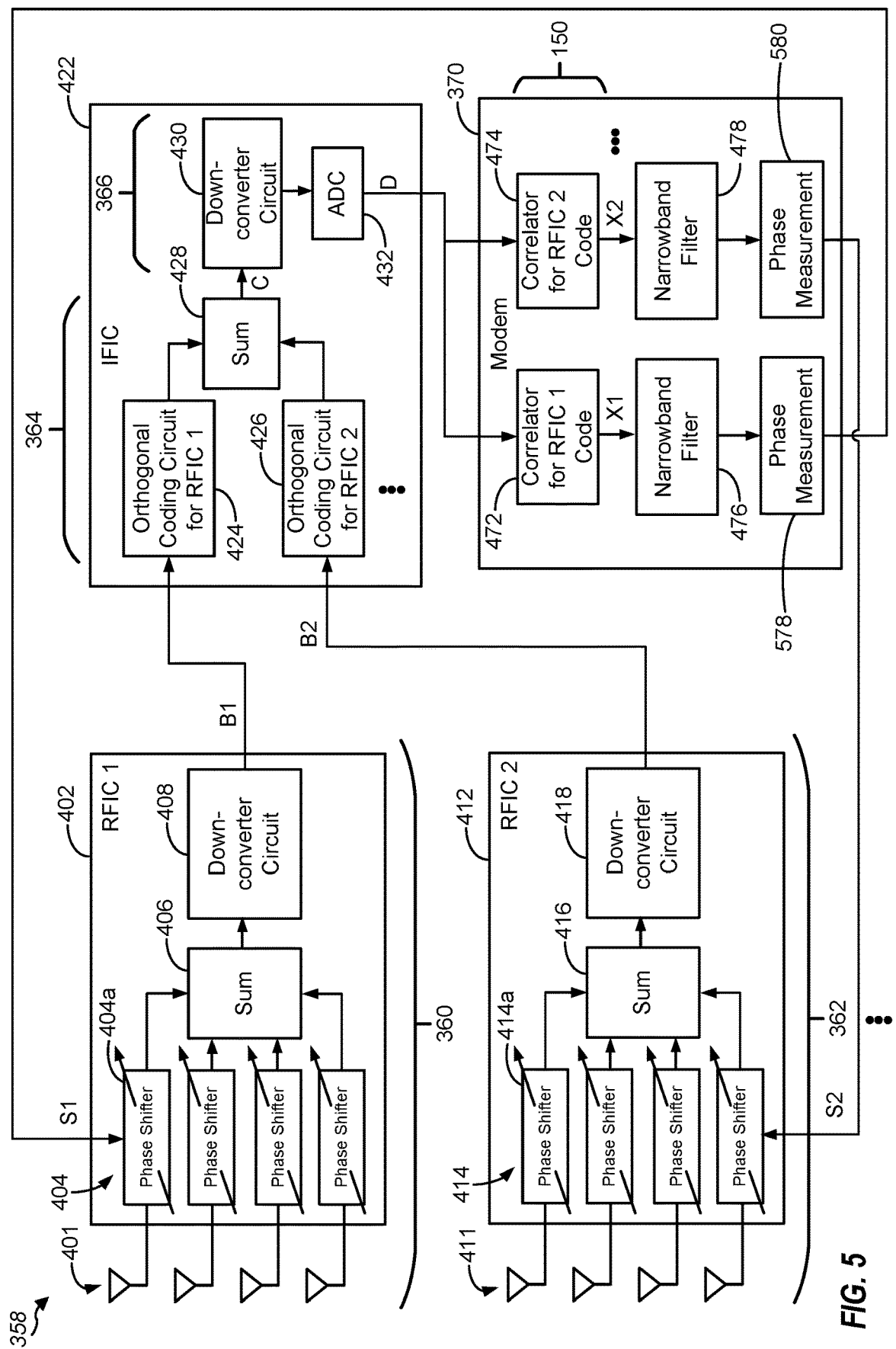
FIG. 5 is a block diagram illustrating another example of a receiver that supports measuring multiple beams in parallel according to some aspects of the disclosure.

FIG. 5 is a block diagram illustrating another example of a receiver 358 that supports measuring multiple beams in parallel according to some aspects of the disclosure. In the example of FIG. 5, the modem 370 includes a first phase measurement device 578 coupled to the first narrowband filter 476 and further includes a second phase measurement device 580 coupled to the second narrowband filter 478. The first phase measurement device 578 may be coupled to the first set of antennas 401 via a first feedback path, and the second phase measurement device 580 may be coupled to the second set of antennas 411 via a second feedback path.

During operation, the modem 370 may use the first phase measurement device 578 to perform a first phase measurement of the first beam B1 (e.g., by measuring phase of the first beam B1 relative to a reference phase) and may use the second phase measurement device 580 to perform a second phase measurement of the second beam B2 (e.g., by measuring phase of the second beam B2 relative to the reference phase). In the example of FIG. 5, the first signal S1 may indicate or correspond to the first phase measurement, and the second signal S2 may indicate or correspond to the second phase measurement.

The receiver 358 may provide the signals S1, S2 to the phase shifter circuits 404, 414 for use in connection with phase shifting or beam steering operations. For example, the receiver 358 may use the first phase shifter circuits 404 to perform a first beam shaping operation associated with the first beam B1 based on the first phase measurement indicated by the first signal S1. As another example, the receiver 358 may use the second phase shifter circuits 414 to perform a second beam shaping operation associated with the second beam B2 based on the second phase measurement. In some examples, estimating phase differences between the beams B1, B2 using the phase measurement devices 578, 580 enables the receiver 358 to perform beamforming across multiple RFICs including the first RFIC 402 and the second RFIC 412. Further, in some examples, by multiplexing and demultiplexing beams as described herein, the receiver 358 may perform the beamforming during a single occasion of the reference signal 320 or during a single time slot.

Figure 6A:
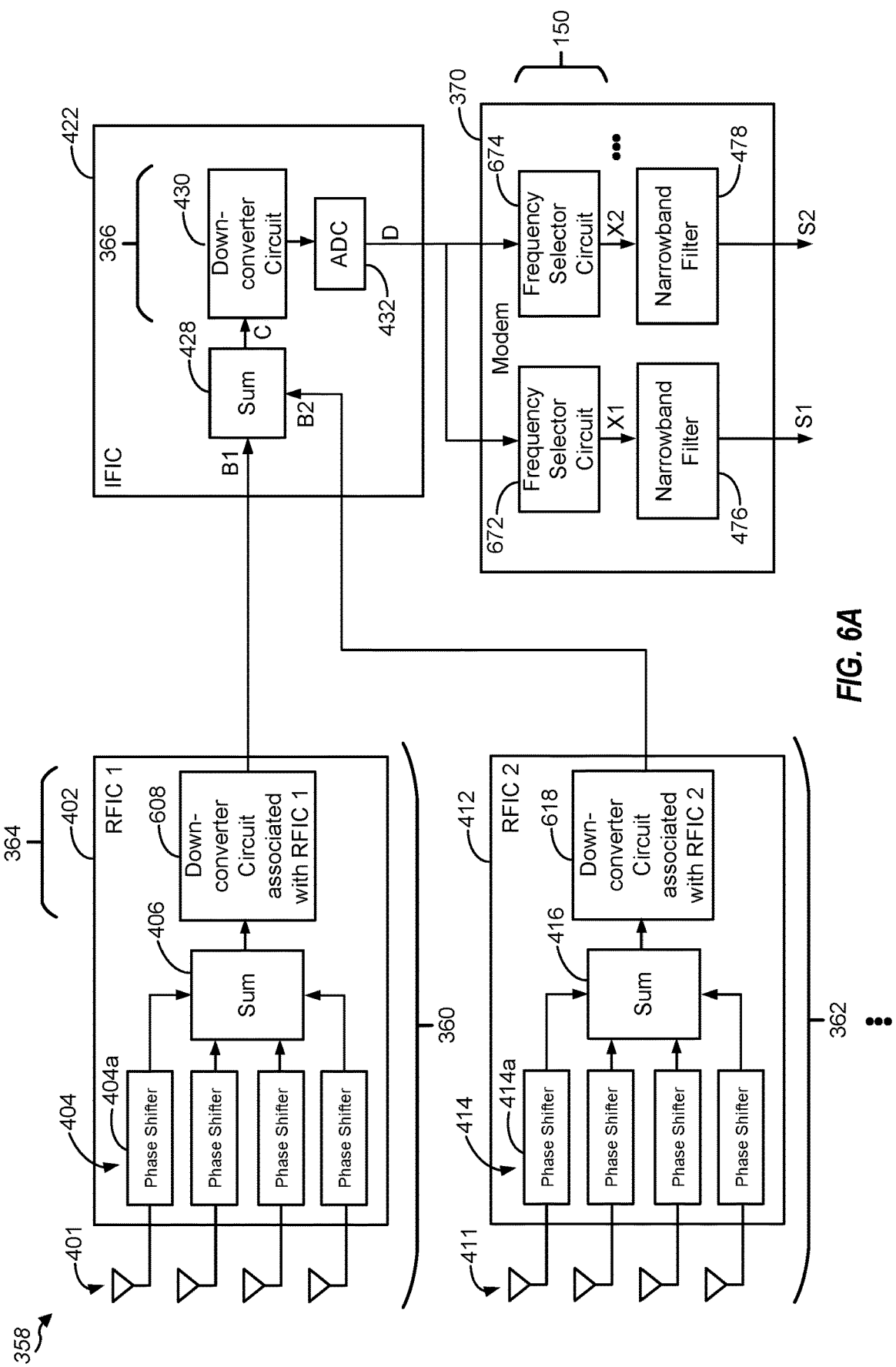
FIG. 6A is a block diagram illustrating another example of a receiver that supports measuring multiple beams in parallel according to some aspects of the disclosure.

FIG. 6A is a block diagram illustrating another example of a receiver 358 that supports measuring multiple beams in parallel according to some aspects of the disclosure. In the example of FIG. 6A, the first RFIC 402 includes a first downconverter circuit 608, and the second RFIC 412 includes a second downconverter circuit 618. In some examples, the beam multiplexing circuitry 364 may include the first downconverter circuit 608 and the second downconverter circuit 618. The beam multiplexing circuitry 364 may further include the summation circuit 428. FIG. 6A also illustrates that the modem 370 may include a first frequency selector circuit 672 and a second frequency selector circuit 674. The beam demultiplexing circuitry 150 may include the first frequency selector circuit 672 and the second frequency selector circuit 674.

During operation, the first RFIC 402 may use the first downconverter circuit 608 to downconvert the first beam B1 to a first IF associated with the first RFIC 402, and the second RFIC 412 may use the second downconverter circuit 618 to downconvert the second beam B2 to a second IF associated with the second RFIC 412, where the second IF is different than the first IF. The IFIC 422 may sum the beams B1, B2 to generate the representation C (e.g., using the summation circuit 428) and may downconvert the representation C to a baseband frequency range. The ADC circuit 432 may digitize the baseband signal generated by the downconverter circuit 430 to generate the representation D.

The modem 370 may use the first frequency selector circuit 672 to select (or isolate) a digital representation of the first beam B1 from the representation D to generate the first output signal X1. The modem 370 may use the second frequency selector circuit 674 to select (or isolate) a digital representation of the second beam B2 from the representation D to generate the second output signal X2.

Figure 6B:
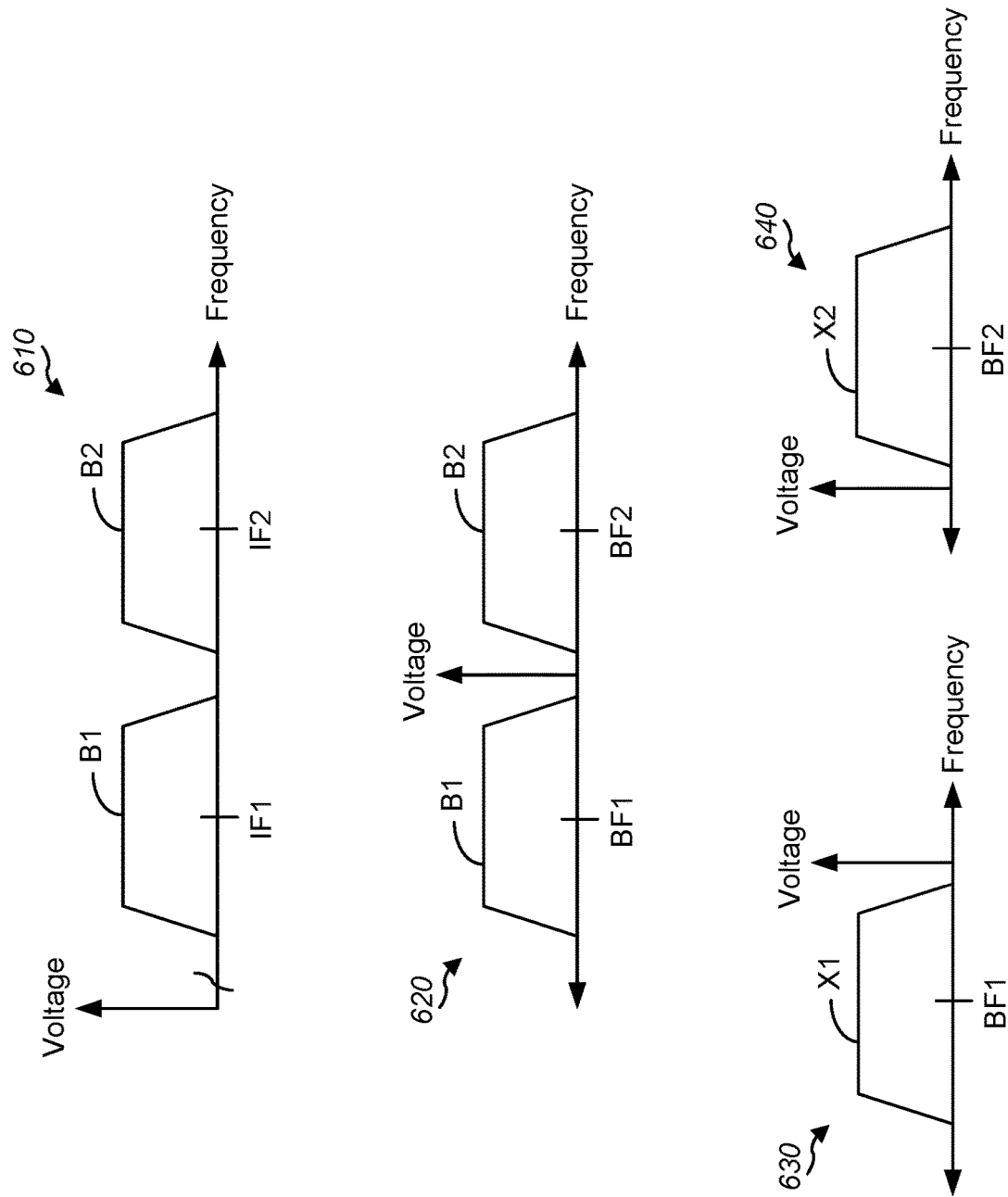
FIG. 6B illustrates examples of signals that may be associated with the receiver of FIG. 6A to support measuring multiple beams in parallel according to some aspects of the disclosure.

To further illustrate, FIG. 6B illustrates examples of signals that may be associated with the receiver 358 of FIG. 6A to support measuring multiple beams in parallel according to some aspects of the disclosure. For example, at 610, FIG. 6B depicts an example of the representation C generated by the summation circuit 428. The representation C may include the first beam B1 (which may be centered about a first intermediate frequency (IF1) by the first downconverter circuit 608) and may further include the second beam B2 (which may be centered about a second intermediate frequency (IF2) by the second downconverter circuit 618).

At 620, FIG. 6B illustrates an example of an output generated by the downconverter circuit 430 based on the representation C. The output generated by the downconverter circuit 430 may include an analog representation of the first beam B1 that is centered about a first baseband frequency (BF1) and may include an analog representation of the second beam B2 that is centered about a second baseband frequency (BF2). The ADC circuit 432 may digitize the output of the downconverter circuit 430 to generate the representation D.

At 630, FIG. 6B illustrates an example of the first output signal X1 generated by the first frequency selector circuit 672. In some examples, the first frequency selector circuit 672 may include a filter (e.g., a passband filter or another filter) configured to pass frequencies associated with the first RFIC 402 (such as a range of frequencies centered about the first baseband frequency BF1) and to reject other frequencies (such as a range of frequencies centered about the second baseband frequency BF2).

At 640, FIG. 6B illustrates an example of the second output signal X2 generated by the second frequency selector circuit 674. In some examples, the second frequency selector circuit 674 may include a filter (e.g., a passband filter or another filter) configured to pass frequencies associated with the second RFIC 412 (such as a range of frequencies centered about the second baseband frequency BF2) and to reject other frequencies (such as a range of frequencies centered about the first baseband frequency BF1).

Figure 7:
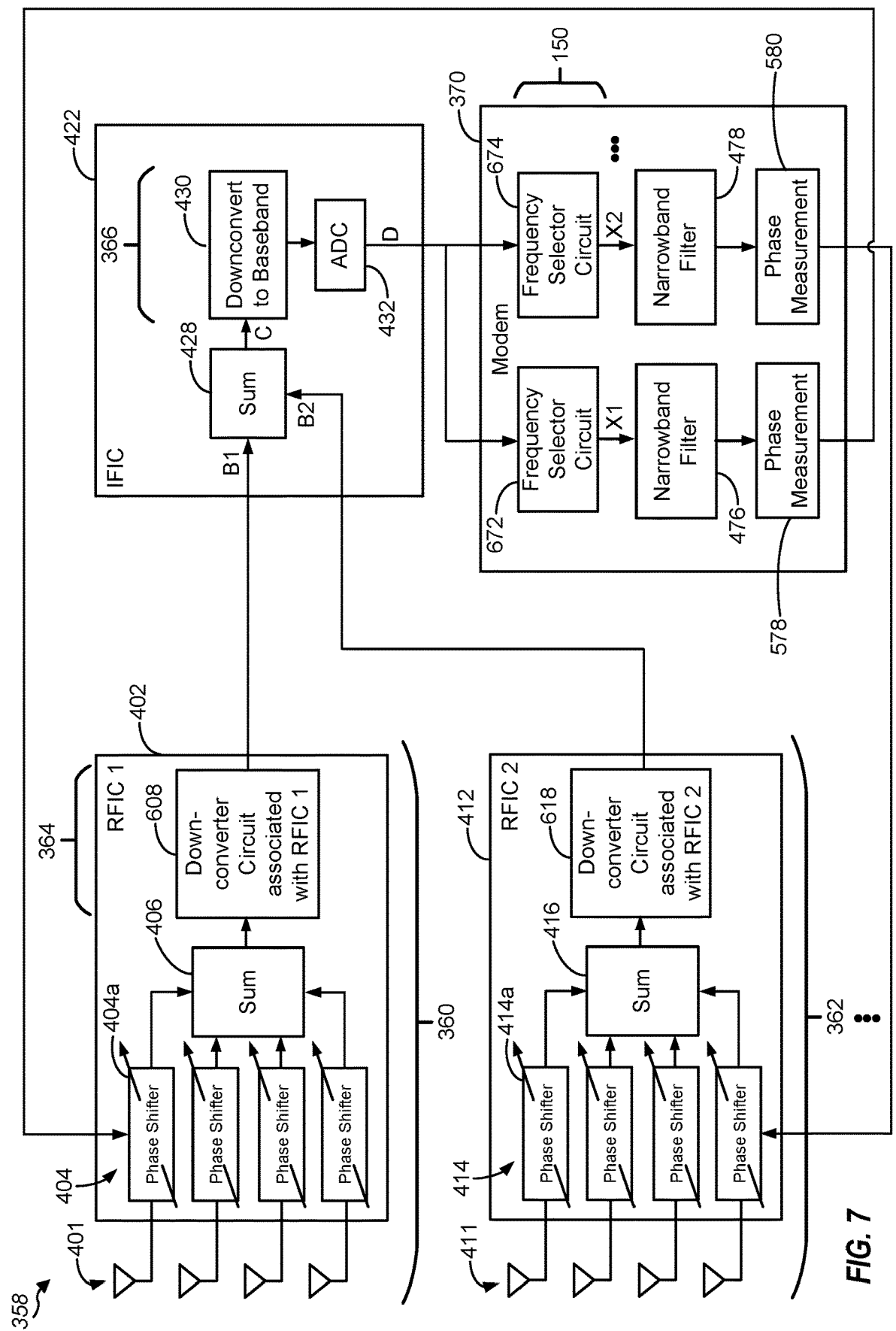
FIG. 7 is a block diagram illustrating another example of a receiver that supports measuring multiple beams in parallel according to some aspects of the disclosure.

FIG. 7 is a block diagram illustrating another example of a receiver 358 that supports measuring multiple beams in parallel according to some aspects of the disclosure. In the example of FIG. 7, the receiver 358 may be configured to perform frequency-based orthogonalization of the beams B1, B2 (e.g., using the first IF and the second IF as described with reference to FIGS. 6A and 6B) and to perform phase shifting or beam steering (e.g., using the phase measurement devices 578, 580 as described with reference to FIG. 5).

Referring again to FIG. 3, in some cases, the UE 115 may dynamically switch between the antenna devices 360, 362 based on beam measurement results during a particular occasion of the reference signal 320. For example, if during a first occasion of the reference signal 320 the UE 115 measures the first beam B1 as having a greater signal strength (or other parameter) than the second beam B2, the UE 115 may receive signals using the first antenna device 360 after the first occasion. If during a second occasion of the reference signal 320 the UE 115 measures the second beam B2 as having a greater signal strength (or other parameter) than the first beam B1, the UE 115 may receive signals using the second antenna device 362 after the second occasion.

Although certain examples have been described separately for convenience, it is noted that some examples herein may be combined without departing from the scope of the disclosure. For example, in some implementations, the receiver 358 may use the signals S1, S2 to perform multiple types of operations, such as both transmission of the measurement report 330 and phase steering using the phase measurement devices 578, 580. Alternatively or in addition, in some implementations, the receiver 358 may use both code-based and frequency-based orthogonalization of beams. In some such examples, the receiver 358 may include any of the orthogonal coding circuits 424, 426, the correlators 472, 474, the downconverter circuits 608, 618, and the frequency selector circuits 672, 674.

In addition, although certain examples have been described with reference to two antenna devices and two RFICs, in other implementations, the receiver 358 may include more than two antenna devices and two RFICs. As an illustrate example, the receiver 358 may include four antenna devices and four RFICs, and the receiver 358 may orthogonalize four beams received using the four antenna devices and four RFICs.

One or more features described herein may enable one or more of reduced power consumption, improved tracking of channel conditions, improved communication reliability, reduced device cost, reduced device size, or reduced device complexity. To illustrate, by selectively combining (e.g., multiplexing) and separating (e.g., demultplexing) orthogonalized representations of the beams B1, B2, the UE 115 may simultaneously measure a number of beams that is greater than a number of receive chains or receive chain components of the UE 115 (such as the downconverter circuit 430 or the ADC circuit 432). For example, the receiver 358 may include a first number of ADC circuits 432 (such as one ADC circuit 432), and the receiver 358 may be configured to simultaneously measure a second number of beams (such as two receive beams), where the second number is greater than the first number. As a result, an amount of time used to measure the beams B1, B2 may be reduced (which may increase an amount of time the UE 115 spends in a "deep sleep" mode, decreasing power consumption, and which may improve tracking of channel conditions in some high mobility applications, improving communication reliability) while also decreasing a number of receive chains or receive chain components of the UE 115 (which may reduce device cost, size, and complexity). Further, in some other examples, measuring multiple beams per occasion of the reference signal 320 may enable the UE 115 to "sleep through" one or more occasions of the reference signal 320, reducing power consumption of the UE 115.

Figure 8:
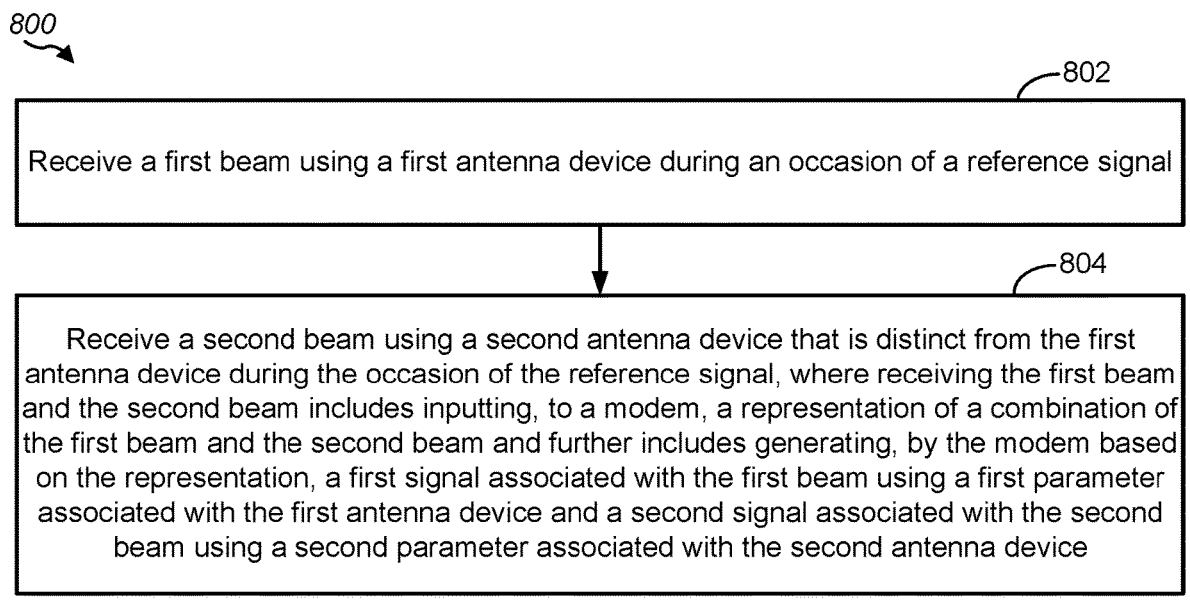
FIG. 8 is a flow chart of a method of operation of a UE that supports measuring multiple beams in parallel according to some aspects of the disclosure.

FIG. 8 is a flow chart of a method 800 of operation of a UE that supports measuring multiple beams in parallel according to some aspects of the disclosure. In some examples, the method 800 is performed by the UE 115.

The method 800 includes receiving a first beam using a first antenna device during an occasion of a reference signal, at 802. For example, during an occasion of the reference signal 320, the receiver 358 may receive the first beam B1 associated with the reference signal 320 using the first antenna device 360.

The method 800 further includes receiving a second beam using a second antenna device that is distinct from the first antenna device during the occasion of the reference signal, at 804. For example, during the occasion of the reference signal 320, the receiver 358 may receive the second beam B2 associated with the reference signal 320 using the second antenna device 362.

In the example of the method 800 of FIG. 8, receiving the first beam and the second beam includes inputting, to a modem, a representation of a combination of the first beam and the second beam. Receiving the first beam and the second beam further includes generating, by the modem based on the representation, a first signal associated with the first beam using a first parameter associated with the first antenna device and a second signal associated with the second beam using a second parameter associated with the second antenna device. For example, the representation of the combination of the first beam and the second beam may correspond to the representation D of the combination of the first beam B1 and the second beam B2, and the UE 115 may input the representation D to the modem 370. The first signal may correspond to the first signal S1, and the second signal may correspond to the second signal S2.

In some examples, the first parameter corresponds to a first code associated with the first antenna device 360, and the second parameter corresponds to a second code that is associated with the second antenna device 362 and that is orthogonal to the first code. For example, the first code may correspond to the first code associated with the first RFIC 402, and the second code may correspond to the second code associated with the second RFIC 412, as described with reference to the examples of FIGS. 4 and 5. The modem 370 may receive the representation D and may correlate (e.g., using the first correlator 472) the representation D to the first code and may correlate (e.g., using the second correlator 474) the representation D to the second code associated with the second RFIC 412.

In some other examples, the first parameter corresponds to a first frequency range associated with the first antenna device, and the second parameter corresponds to a second frequency range that is associated with the second antenna device and that is orthogonal to the first frequency range. For example, the first frequency range may correspond to the first baseband frequency BF1, and the second frequency range may correspond to the second baseband frequency BF2. The first frequency selector circuit 672 may be configured to pass frequencies associated with first baseband frequency BF1, and the second frequency selector circuit 674 may be configured to pass frequencies associated with the second baseband frequency BF2, such as described with reference to one or more of FIGS. 6A, 6B, and 7.

In some examples, the first signal corresponds to a first digitized baseband representation of the first beam, and the second signal corresponds to a second digitized baseband representation of the second beam. To illustrate, the first signal S1 may correspond to a first digitized baseband representation of the first beam B1, and the second signal S2 may correspond to a second digitized baseband representation of the second beam S2. In such examples, the method 800 may further include transmitting the measurement report 330 based on the first signal S1 and the second signal S2, as described with reference to FIGS. 4 and 6A.

In some other examples, the first signal indicates a first phase measurement of the first beam, and the second signal indicates a second phase measurement of the second beam. To illustrate, as described with reference to FIGS. 5 and 7, the signals S1, S2 may be provided (e.g., fed back) to the antenna devices 360, 362 to enable certain operations by the UE 115, as illustrated in the examples of FIGS. 5 and 7. For example, the first antenna device 360 may perform a first beam shaping operation associated with the first beam B1 based on the first phase measurement indicated by the first signal S1, and the second antenna device 362 may perform a second beam shaping operation associated with the second beam B2 based on the second phase measurement indicated by the second signal S2.

Figure 9:
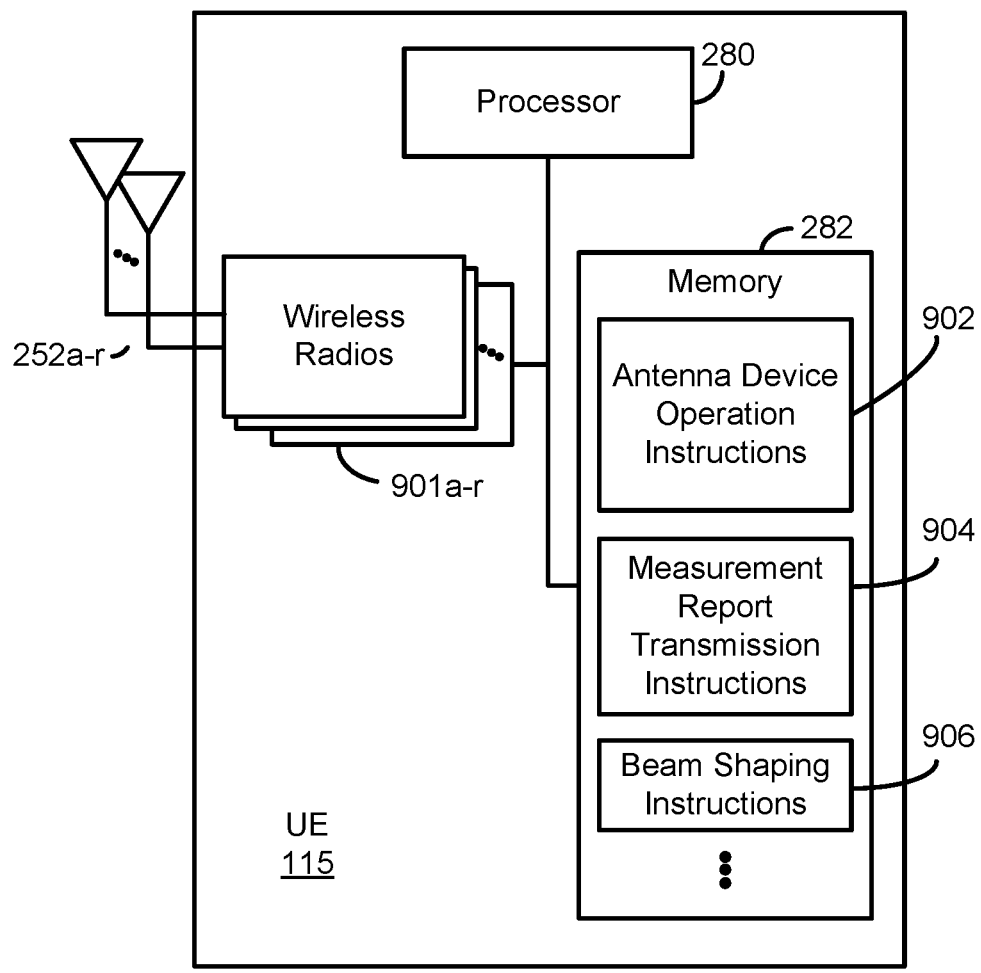
FIG. 9 is a block diagram of an example of a UE that supports measuring multiple beams in parallel according to some aspects of the disclosure.

FIG. 9 is a block diagram of an example of a UE 115 that supports measuring multiple beams in parallel according to some aspects of the disclosure. The UE 115 may include structure, hardware, or components illustrated in FIG. 2. For example, the UE 115 may include the processor 280, which may execute instructions stored in the memory 282. Using the processor 280, the UE 115 may transmit and receive signals via wireless radios 901a-r and antennas 252a-r. The wireless radios 901a-r may include one or more components or devices described herein, such as the modulator/demodulators 254a-r, the MIMO detector 256, the receive processor 258, the transmit processor 264, the TX MIMO processor 266, the transmitter 356, the receiver 358, one or more other components or devices, or a combination thereof.

The memory 282 may store instructions executable by the processor 280 to initiate, perform, or control one or more operations described herein. For example, the memory 282 may store antenna device operation instructions 902 executable by the processor 280 to control operation of the antenna devices 360, 360, such as by providing a respective enable signal to each of the antenna devices 360, 360 to determine whether the each antenna device 360, 360 is operative during a particular occasion of the reference signal 320. As another example, the memory 282 may store measurement report transmission instructions 904 executable by the processor 280 to transmit the measurement report 330 based on the signals S1, S2. As an additional example, the memory 282 may store beam shaping instructions 906 executable by the processor 280 to initiate or control beam shaping operations performed by antenna devices 360, 362 based on the signals S1, S2.

According to some further aspects, in a first aspect, a method of wireless communication includes receiving a first beam using a first antenna device during an occasion of a reference signal. The method further includes receiving a second beam using a second antenna device that is distinct from the first antenna device during the occasion of the reference signal. Receiving the first beam and the second beam includes inputting, to a modem, a representation of a combination of the first beam and the second beam and further includes generating, by the modem based on the representation, a first signal associated with the first beam using a first parameter associated with the first antenna device and a second signal associated with the second beam using a second parameter associated with the second antenna device.

In a second aspect alternatively or in addition to the first aspect, the first parameter corresponds to a first code associated with the first antenna device, and the second parameter corresponds to a second code associated with the second antenna device, the second code orthogonal to the first code.

In a third aspect alternatively or in addition to one or more of the first through second aspects, the first parameter corresponds to a first frequency range associated with the first antenna device, and the second parameter corresponds to a second frequency range associated with the second antenna device, the second frequency range orthogonal to the first frequency range.

In a fourth aspect alternatively or in addition to one or more of the first through third aspects, the first signal corresponds to a first digitized baseband representation of the first beam, the second signal corresponds to a second digitized baseband representation of the second beam, and the method includes transmitting a measurement report based on the first digitized baseband representation and the second digitized baseband representation.

In a fifth aspect alternatively or in addition to one or more of the first through fourth aspects, the first signal indicates a first phase measurement of the first beam, the second signal indicates a second phase measurement of the second beam, and the method includes performing a first beam shaping operation associated with the first beam based on the first phase measurement and performing a second beam shaping operation associated with the second beam based on the second phase measurement.

In a sixth aspect alternatively or in addition to one or more of the first through fifth aspects, an apparatus for wireless communication includes a transmitter and a receiver configured to receive a first beam using a first antenna device during an occasion of a reference signal. The receiver is further configured to receive a second beam using a second antenna device that is distinct from the first antenna device during the occasion of the reference signal and to generate a representation of a combination of the first beam and the second beam. The receiver is further configured to generate, based on the representation, a first signal associated with the first beam using a first parameter associated with the first antenna device and a second signal associated with the second beam using a second parameter associated with the second antenna device.

In a seventh aspect alternatively or in addition to one or more of the first through sixth aspects, the apparatus includes a first radio frequency integrated circuit (RFIC) that includes or is coupled to the first antenna device and a second RFIC that includes or is coupled to the second antenna device.

In an eighth aspect alternatively or in addition to one or more of the first through seventh aspects, the apparatus includes an intermediate frequency integrated circuit (IFIC) coupled to the first RFIC and to the second RFIC.

In a ninth aspect alternatively or in addition to one or more of the first through eighth aspects, the IFIC includes an analog-to-digital converter (ADC) circuit configured to generate the representation of the combination of the first beam and the second beam.

In a tenth aspect alternatively or in addition to one or more of the first through ninth aspects, the apparatus includes a modem coupled to the IFIC, wherein the modem is configured to receive the representation of the combination of the first beam and the second beam from the IFIC and to generate the first signal and the second signal based on the representation of the combination of the first beam and the second beam.

In an eleventh aspect alternatively or in addition to one or more of the first through tenth aspects, the apparatus includes a first orthogonal coding circuit configured to apply a first code to the first beam, where the first code corresponds to the first parameter, and further includes a second orthogonal coding circuit configured to apply a second code to the second beam, where the second code corresponds to the second parameter.

In a twelfth aspect alternatively or in addition to one or more of the first through eleventh aspects, the apparatus includes a first correlator configured to correlate the representation of the combination of the first beam and the second beam to the first code to generate a first output signal associated with the first beam and further includes a second correlator configured to correlate the representation of the combination of the first beam and the second beam to the second code to generate a second output signal associated with the second beam.

In a thirteenth aspect alternatively or in addition to one or more of the first through twelfth aspects, the apparatus includes a first narrowband filter coupled to the first correlator and configured to perform narrowband filtering of the first output signal to generate the first signal and further includes a second narrowband filter coupled to the second correlator and configured to perform narrowband filtering of the second output signal to generate the second signal.

In a fourteenth aspect alternatively or in addition to one or more of the first through thirteenth aspects, the apparatus includes a first phase measurement device configured to perform a first phase measurement of the first beam to generate the first signal and a second phase measurement device configured to perform a second phase measurement of the second beam to generate the second signal.

In a fifteenth aspect alternatively or in addition to one or more of the first through fourteenth aspects, the apparatus includes a first set of phase shifter circuits associated with the first antenna device and a second set of phase shifter circuits associated with the second antenna device. The apparatus further includes a first feedback path coupled to the first phase measurement device and the first set of phase shifter circuits and configured to provide the first signal the first set of phase shifter circuits and also includes a second feedback path coupled to the second phase measurement device and the second set of phase shifter circuits and configured to provide the second signal to the second set of phase shifter circuits.

In a sixteenth aspect alternatively or in addition to one or more of the first through fifteenth aspects, the apparatus includes a first downconverter circuit configured to downconvert the first beam to a first intermediate frequency (IF) associated with the first antenna device, where the first IF corresponds to the first parameter, and further includes a second downconverter circuit configured to downconvert the second beam to a second IF associated with the second antenna device, where the second IF corresponds to the first parameter.

In a seventeenth aspect alternatively or in addition to one or more of the first through sixteenth aspects, the apparatus includes a first frequency selector circuit configured to select a digital representation of the first beam from the representation to generate a first output signal and further includes a second frequency selector circuit configured to select a digital representation of the second beam from the representation to generate a second output signal.

In an eighteenth aspect alternatively or in addition to one or more of the first through seventeenth aspects, the apparatus includes a first narrowband filter coupled to the first frequency selector circuit and configured to perform narrowband filtering of the first output signal to generate the first signal and further includes a second narrowband filter coupled to the second frequency selector circuit and configured to perform narrowband filtering of the second output signal to generate the second signal.

In a nineteenth aspect alternatively or in addition to one or more of the first through eighteenth aspects, the apparatus includes a first phase measurement device configured to perform a first phase measurement of the first beam to generate the first signal and further includes a second phase measurement device configured to perform a second phase measurement of the second beam to generate the second signal.

In a twentieth aspect alternatively or in addition to one or more of the first through nineteenth aspects, the apparatus includes a first set of phase shifter circuits associated with the first antenna device and further includes a second set of phase shifter circuits associated with the second antenna device. The apparatus further includes a first feedback path coupled to the first phase measurement device and the first set of phase shifter circuits and configured to provide the first signal the first set of phase shifter circuits and also includes a second feedback path coupled to the second phase measurement device and the second set of phase shifter circuits and configured to provide the second signal to the second set of phase shifter circuits.

In a twenty-first aspect alternatively or in addition to one or more of the first through twentieth aspects, a non-transitory computer-readable medium storing instructions executable by a processor of a user equipment (UE) to initiate, perform, or control operations. The operations include receiving a first beam using a first antenna device during an occasion of a reference signal. The operations further include receiving a second beam using a second antenna device that is distinct from the first antenna device during the occasion of the reference signal. Receiving the first beam and the second beam includes inputting, to a modem, a representation of a combination of the first beam and the second beam and further includes generating, by the modem based on the representation, a first signal associated with the first beam using a first parameter associated with the first antenna device and a second signal associated with the second beam using a second parameter associated with the second antenna device.

In a twenty-second aspect alternatively or in addition to one or more of the first through twenty-first aspects, the first parameter corresponds to a first code associated with the first antenna device, and the second parameter corresponds to a second code associated with the second antenna device, the second code orthogonal to the first code.

In a twenty-third aspect alternatively or in addition to one or more of the first through twenty-second aspects, the first parameter corresponds to a first frequency range associated with the first antenna device, and the second parameter corresponds to a second frequency range associated with the second antenna device, the second frequency range orthogonal to the first frequency range.

In a twenty-fourth aspect alternatively or in addition to one or more of the first through twenty-third aspects, the first signal corresponds to a first digitized baseband representation of the first beam, the second signal corresponds to a second digitized baseband representation of the second beam, and the operations include transmitting a measurement report based on the first digitized baseband representation and the second digitized baseband representation.

In a twenty-fifth aspect alternatively or in addition to one or more of the first through twenty-fourth aspects, the first signal indicates a first phase measurement of the first beam, the second signal indicates a second phase measurement of the second beam, and the operations further include: performing a first beam shaping operation associated with the first beam based on the first phase measurement; and performing a second beam shaping operation associated with the second beam based on the second phase measurement.

In a twenty-sixth aspect alternatively or in addition to one or more of the first through twenty-fifth aspects, an apparatus for wireless communication includes means for transmitting signals. The apparatus further includes means for receiving a first beam using a first antenna device during an occasion of a reference signal, for receiving a second beam using a second antenna device that is distinct from the first antenna device during the occasion of the reference signal, for generating a representation of a combination of the first beam and the second beam, and for generating, based on the representation, a first signal associated with the first beam using a first parameter associated with the first antenna device and a second signal associated with the second beam using a second parameter associated with the second antenna device. In some examples, the means for transmitting may include or correspond to the transmitter 356, and the means for receiving may include or correspond to the receiver 358.

In a twenty-seventh aspect alternatively or in addition to one or more of the first through twenty-sixth aspects, the first parameter corresponds to a first code associated with the first antenna device, and the second parameter corresponds to a second code associated with the second antenna device, the second code orthogonal to the first code.

In a twenty-eighth aspect alternatively or in addition to one or more of the first through twenty-seventh aspects, the first parameter corresponds to a first frequency range associated with the first antenna device, and the second parameter corresponds to a second frequency range associated with the second antenna device, the second frequency range orthogonal to the first frequency range.

In a twenty-ninth aspect alternatively or in addition to one or more of the first through twenty-eighth aspects, the first signal corresponds to a first digitized baseband representation of the first beam, the second signal corresponds to a second digitized baseband representation of the second beam, and the means for transmitting is configured to transmit a measurement report based on the first digitized baseband representation and the second digitized baseband representation.

In a thirtieth aspect alternatively or in addition to one or more of the first through twenty-ninth aspects, the first signal indicates a first phase measurement of the first beam, the second signal indicates a second phase measurement of the second beam, and the means for receiving is configured to perform a first beam shaping operation associated with the first beam based on the first phase measurement and to perform a second beam shaping operation associated with the second beam based on the second phase measurement.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, or modules described herein may include processors, electronics devices, hardware devices, electronics components, logical circuits, memories, software codes, firmware codes, among other examples, or any combination thereof. Software may include instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language, or otherwise. In addition, features discussed herein may be implemented via specialized processor circuitry, via executable instructions, or combinations thereof.

Those of skill would further appreciate that the various illustrative logical blocks, modules, circuits, and operations described herein may be implemented as electronic hardware, computer software, or combinations of both. To illustrate, various illustrative components, blocks, modules, circuits, and operations have been described generally. Whether such functionality is implemented as hardware or software may depend upon the particular application and parameters of the overall system. Skilled artisans may implement the described functionality in varying ways for each particular application, but such implementation decisions should not be interpreted as causing a departure from the scope of the disclosure. Skilled artisans will also readily recognize that the order or combination of components, methods, or interactions that are described herein are examples and that the components, methods, or interactions of the various aspects of the disclosure may be combined or performed in ways other than those illustrated and described herein.

A hardware and data processing apparatus used to implement the various illustrative logics, logical blocks, modules, and circuits described herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform one or more functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In some aspects, one or more functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, or one or more modules of computer program instructions, encoded on a computer storage media for execution by, or to control the operation of, a data processing apparatus.

If implemented in software, the functions may be stored on a computer-readable medium. A processor or method described herein may be implemented in a processor-executable software module which may reside on a computer-readable medium. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or process may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
receiving a first beam using a first antenna device during an occasion of a reference signal;
receiving a second beam using a second antenna device that is distinct from the first antenna device during the occasion of the reference signal;
downconverting a signal representing the first beam and the second beam to generate a downconverted signal;
inputting, to a modem, a representation of a combination of the first beam and the second beam in accordance with the downconverted signal; and
generating, by the modem based on the representation, a first signal associated with the first beam using a first parameter associated with the first antenna device and a second signal associated with the second beam using a second parameter associated with the second antenna device.

2. The method of claim 1, wherein the first parameter corresponds to a first code associated with the first antenna device, and wherein the second parameter corresponds to a second code associated with the second antenna device, the second code orthogonal to the first code.

3. The method of claim 1, wherein the first parameter corresponds to a first frequency range associated with the first antenna device, and wherein the second parameter corresponds to a second frequency range associated with the second antenna device, the second frequency range orthogonal to the first frequency range.

4. The method of claim 1, wherein the first signal corresponds to a first digitized baseband representation of the first beam, wherein the second signal corresponds to a second digitized baseband representation of the second beam, further comprising transmitting a measurement report based on the first digitized baseband representation and the second digitized baseband representation.

5. The method of claim 1, wherein the first signal indicates a first phase measurement of the first beam, wherein the second signal indicates a second phase measurement of the second beam, and further comprising:
 performing a first beam shaping operation associated with the first beam based on the first phase measurement; and
 performing a second beam shaping operation associated with the second beam based on the second phase measurement.

6. An apparatus for wireless communication, comprising:
 a transmitter; and
 a receiver configured to:
  receive a first beam using a first antenna device during an occasion of a reference signal;
  receive a second beam using a second antenna device that is distinct from the first antenna device during the occasion of the reference signal;
  downconvert a signal representing the first beam and the second beam to generate a downconverted signal;
  generate a representation of a combination of the first beam and the second beam in accordance with the downconverted signal; and
  generate, based on the representation, a first signal associated with the first beam using a first parameter associated with the first antenna device and a second signal associated with the second beam using a second parameter associated with the second antenna device.

7. The apparatus of claim 6, further comprising:
 a first radio frequency integrated circuit (RFIC), wherein the first RFIC includes or is coupled to the first antenna device; and
 a second RFIC, wherein the second RFIC includes or is coupled to the second antenna device.

8. The apparatus of claim 7, further comprising an intermediate frequency integrated circuit (IFIC) coupled to the first RFIC and to the second RFIC.

9. The apparatus of claim 8, wherein the IFIC includes an analog-to-digital converter (ADC) circuit configured to digitize the downconverted signal to generate the representation of the combination of the first beam and the second beam.

10. The apparatus of claim 8, further comprising a modem coupled to the IFIC, wherein the modem is configured to receive the representation of the combination of the first beam and the second beam from the IFIC and to generate the first signal and the second signal based on the representation of the combination of the first beam and the second beam.

11. The apparatus of claim 6, further comprising:
 a first orthogonal coding circuit configured to apply a first code to the first beam, wherein the first code corresponds to the first parameter; and
 a second orthogonal coding circuit configured to apply a second code to the second beam, wherein the second code corresponds to the second parameter.

12. The apparatus of claim 11, further comprising:
 a first correlator configured to correlate the representation of the combination of the first beam and the second beam to the first code to generate a first output signal associated with the first beam; and
 a second correlator configured to correlate the representation of the combination of the first beam and the second beam to the second code to generate a second output signal associated with the second beam.

13. The apparatus of claim 12, further comprising:
 a first narrowband filter coupled to the first correlator and configured to perform narrowband filtering of the first output signal to generate the first signal; and
 a second narrowband filter coupled to the second correlator and configured to perform narrowband filtering of the second output signal to generate the second signal.

14. The apparatus of claim 12, further comprising:
 a first phase measurement device configured to perform a first phase measurement of the first beam to generate the first signal; and
 a second phase measurement device configured to perform a second phase measurement of the second beam to generate the second signal.

15. The apparatus of claim 14, further comprising:
 a first set of phase shifter circuits associated with the first antenna device;
 a second set of phase shifter circuits associated with the second antenna device;
 a first feedback path coupled to the first phase measurement device and the first set of phase shifter circuits and configured to provide the first signal the first set of phase shifter circuits; and
 a second feedback path coupled to the second phase measurement device and the second set of phase shifter circuits and configured to provide the second signal to the second set of phase shifter circuits.

16. The apparatus of claim 6, further comprising:
 a first downconverter circuit configured to downconvert the first beam to a first intermediate frequency (IF) associated with the first antenna device, wherein the first IF corresponds to the first parameter; and
 a second downconverter circuit configured to downconvert the second beam to a second IF associated with the second antenna device, wherein the second IF corresponds to the first parameter.

17. The apparatus of claim 16, further comprising:
 a first frequency selector circuit configured to select a digital representation of the first beam from the representation to generate a first output signal; and
 a second frequency selector circuit configured to select a digital representation of the second beam from the representation to generate a second output signal.

18. The apparatus of claim 17, further comprising:
 a first narrowband filter coupled to the first frequency selector circuit and configured to perform narrowband filtering of the first output signal to generate the first signal; and
 a second narrowband filter coupled to the second frequency selector circuit and configured to perform narrowband filtering of the second output signal to generate the second signal.

19. The apparatus of claim 17, further comprising:
a first phase measurement device configured to perform a first phase measurement of the first beam to generate the first signal; and
a second phase measurement device configured to perform a second phase measurement of the second beam to generate the second signal.

20. The apparatus of claim 19, further comprising:
a first set of phase shifter circuits associated with the first antenna device;
a second set of phase shifter circuits associated with the second antenna device;
a first feedback path coupled to the first phase measurement device and the first set of phase shifter circuits and configured to provide the first signal the first set of phase shifter circuits; and
a second feedback path coupled to the second phase measurement device and the second set of phase shifter circuits and configured to provide the second signal to the second set of phase shifter circuits.

21. A non-transitory computer-readable medium storing instructions executable by a processor of a user equipment (UE) to initiate, perform, or control operations, the operations comprising:
receiving a first beam using a first antenna device during an occasion of a reference signal;
receiving a second beam using a second antenna device that is distinct from the first antenna device during the occasion of the reference signal;
downconverting a signal representing the first beam and the second beam to generate a downconverted signal;
inputting, to a modem, a representation of a combination of the first beam and the second beam in accordance with the downconverted signal; and
generating, by the modem based on the representation, a first signal associated with the first beam using a first parameter associated with the first antenna device and a second signal associated with the second beam using a second parameter associated with the second antenna device.

22. The non-transitory computer-readable medium of claim 21, wherein the first signal corresponds to a first digitized baseband representation of the first beam, wherein the second signal corresponds to a second digitized baseband representation of the second beam, and wherein the operations further comprise transmitting a measurement report based on the first digitized baseband representation and the second digitized baseband representation.

23. The non-transitory computer-readable medium of claim 21, wherein the first signal indicates a first phase measurement of the first beam, wherein the second signal indicates a second phase measurement of the second beam, and wherein the operations further comprise:
performing a first beam shaping operation associated with the first beam based on the first phase measurement; and
performing a second beam shaping operation associated with the second beam based on the second phase measurement.

24. An apparatus for wireless communication, comprising:
means for transmitting signals; and
means for receiving a first beam using a first antenna device during an occasion of a reference signal, for receiving a second beam using a second antenna device that is distinct from the first antenna device during the occasion of the reference signal, for downconverting a signal representing the first beam and the second beam to generate a downconverted signal, for a representation of a combination of the first beam and the second beam in accordance with the downconverted signal, and for generating, based on the representation, a first signal associated with the first beam using a first parameter associated with the first antenna device and a second signal associated with the second beam using a second parameter associated with the second antenna device.

25. The apparatus of claim 24, wherein the first parameter corresponds to a first code associated with the first antenna device, and wherein the second parameter corresponds to a second code associated with the second antenna device, the second code orthogonal to the first code.

26. The apparatus of claim 24, wherein the first parameter corresponds to a first frequency range associated with the first antenna device, and wherein the second parameter corresponds to a second frequency range associated with the second antenna device, the second frequency range orthogonal to the first frequency range.

27. The apparatus of claim 24, wherein the first signal corresponds to a first digitized baseband representation of the first beam, wherein the second signal corresponds to a second digitized baseband representation of the second beam, and wherein the means for transmitting is configured to transmit a measurement report based on the first digitized baseband representation and the second digitized baseband representation.

28. The apparatus of claim 24, wherein the first signal indicates a first phase measurement of the first beam, wherein the second signal indicates a second phase measurement of the second beam, and wherein the means for receiving is configured to perform a first beam shaping operation associated with the first beam based on the first phase measurement and to perform a second beam shaping operation associated with the second beam based on the second phase measurement.

29. The method of claim 1, wherein downconverting the signal includes modifying a frequency spectrum associated with the signal prior to digitizing the downconverted signal.

30. The apparatus of claim 6, wherein the receiver includes:
a summation circuit configured to sum the first beam and the second beam to generate the signal representing the first beam and the second beam;
a downconverter circuit having an input coupled to receive the signal from the summation circuit and configured to generate the downconvert the signal to generate the downconverted signal; and
an analog-to-digital converter (ADC) circuit coupled to receive the downconverted signal from the downconverter circuit and configured to generate the representation of the combination of the first beam and the second beam.

* * * * *